(12) United States Patent
Nusbaum (10) Patent No.: US 10,165,113 B2
(45) Date of Patent: Dec. 25, 2018

(54) SYSTEM AND METHOD FOR PROVIDING HEALTHCARE RELATED SERVICES

(75) Inventor: Michael Jay Nusbaum, Far Hills, NJ (US)

(73) Assignee: Giffen Solutions, LLC, Far Hills, NJ (US)

( * ) Notice: Subject to any disclaimer, the term of this patent is extended or adjusted under 35 U.S.C. 154(b) by 99 days.

(21) Appl. No.: 13/613,690

(22) Filed: Sep. 13, 2012

(65) Prior Publication Data

US 2013/0064358 A1 Mar. 14, 2013

Related U.S. Application Data

(60) Provisional application No. 61/534,109, filed on Sep. 13, 2011.

(51) Int. Cl.
*H04M 11/00* (2006.01)
*H04M 3/42* (2006.01)
*H04M 1/64* (2006.01)
*H04M 3/493* (2006.01)

(52) U.S. Cl.
CPC ...... *H04M 3/42068* (2013.01); *H04M 3/4936* (2013.01)

(58) Field of Classification Search
CPC ........ G06F 21/6245; G06F 2221/2115; H04M 2203/354; H04M 2203/553; H04M 2207/18; H04M 2242/04; H04M 3/42042; H04M 3/42068; H04M 3/42348; H04M 3/5116; H04W 12/06; H04W 4/22; H04W 76/007
USPC .......................................... 379/88.01–88.19
See application file for complete search history.

(56) References Cited

U.S. PATENT DOCUMENTS

| | | | |
|---|---|---|---|
| 6,680,999 B1 | 1/2004 | Garcia | |
| 2004/0125938 A1 | 7/2004 | Turcan et al. | |
| 2005/0259641 A1* | 11/2005 | Beninato et al. | 370/354 |
| 2008/0188198 A1* | 8/2008 | Patel et al. | 455/404.2 |
| 2008/0201429 A1* | 8/2008 | Barbell | G06F 19/3418 709/205 |
| 2009/0111437 A1 | 4/2009 | Elman et al. | |
| 2009/0164253 A1 | 6/2009 | Lyshkow | |
| 2009/0240525 A1* | 9/2009 | Sadler | G16H 10/60 705/2 |
| 2010/0094657 A1* | 4/2010 | Stern et al. | 705/3 |

(Continued)

OTHER PUBLICATIONS

International Search Report for and Written Opinion of the International Searching Authority for International Patent Application No. PCT/US2012/055078 dated Nov. 16, 2012.

*Primary Examiner* — Solomon G Bezuayehu
(74) *Attorney, Agent, or Firm* — Pryor Cashman LLP (57) ABSTRACT

A system and a method for receiving, by a processing device, a call from a communication device associated with a patient, the communication device associated with a patient having a unique identifier; associating, by the processing device, the unique identifier with a personal health profile stored in a database; determining, by the processing device, a communication device associated with a health care provider; transmitting the personal health profile to a communication device associated with a health care provider; and communicatively connecting the call from the communication device associated with the patient with the communication device associated with the health care provider.

11 Claims, 6 Drawing Sheets

(56) References Cited

U.S. PATENT DOCUMENTS

| | | | |
|---|---|---|---|
| 2010/0158213 A1* | 6/2010 | Mikan | H04M 3/42221 |
| | | | 379/88.14 |
| 2011/0231184 A1* | 9/2011 | Kerr | 704/201 |
| 2012/0143778 A1* | 6/2012 | Sundaram et al. | 705/317 |
| 2014/0236626 A1* | 8/2014 | Reddy Bynagari | G06Q 50/24 |
| | | | 705/3 |

\* cited by examiner

SYSTEM AND METHOD FOR PROVIDING HEALTHCARE RELATED SERVICES

CROSS-REFERENCE TO RELATED APPLICATIONS

The present application claims the benefit, pursuant to the provisions of 35 U.S.C. 119, of U.S. Provisional Application Ser. No. 61/534,109, titled "System and Method for Providing Healthcare Related Services", filed on Sep. 13, 2011, which is herein incorporated by reference.

FIELD OF THE INVENTION

The present invention relates generally to a system and a method for providing various health care related services to the patients and the health care providers, more particularly to an enhanced system and method for receiving and managing patient communication to health care providers.

BACKGROUND OF THE INVENTION

Currently, medical professionals frequently utilize conventional answering services to handle calls received from patients, particularly, those received after-hours. In fact, as the volume of calls increases, answering service systems have become necessary for doctors, practitioners, and other medical professionals who want to provide their patients with the optimal care and service both during and after business hours. However, such conventional answering services provide basic support such as operators answering patient calls on behalf of the doctor or other medical professionals, taking messages on their behalf, forwarding the calls to the medical professionals or paging the medical professionals in cases of emergencies. These existing services are ancient and add no value to the health care providers. The services merely function to receive the patient's call and act as a go between to contact the medical professional. The patient calling these conventional answering services can only provide their contact information and wait for a response from the medical professional. Also, the medical professional does not have access to the patient's health data when he or she is speaking to the patient seeking medical advice. Furthermore, the conversation between the patient and the medical professional during the call can be billable events, however, the health care providers don't typically capture such events since there is no detailed record or transcript of the calls.

Thus there is a need for an improved system and method to overcome the deficiencies of the conventional answering services and provide the many services that are needed in the health care industry in order to receive and manage patient communication to the health care providers.

SUMMARY OF THE INVENTION

Embodiments of the present invention are directed to an enhanced system and method for receiving and managing communication between the patient and the health care providers. The method includes receiving the patient's call, retrieving patient's profile information, and forwarding the profile information to the appropriate health care provider (HCP) prior to routing the call to the HCP 108. The method also includes recording the conversation of the call between the patient and the doctor, transcribing the call and creating an electronic record of the call with the corresponding transcript upon which an informal decision as to whether or not to bill for the call can be made. The method further includes filling the forms for billed calls, and submitting the form along with the record, transcript and bill to the insurance company. Thus, billable events are identified and captured based on the records created and submitted for billing by the system and method of the present invention.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention.

DETAILED DESCRIPTION OF THE INVENTION

Figure 1:
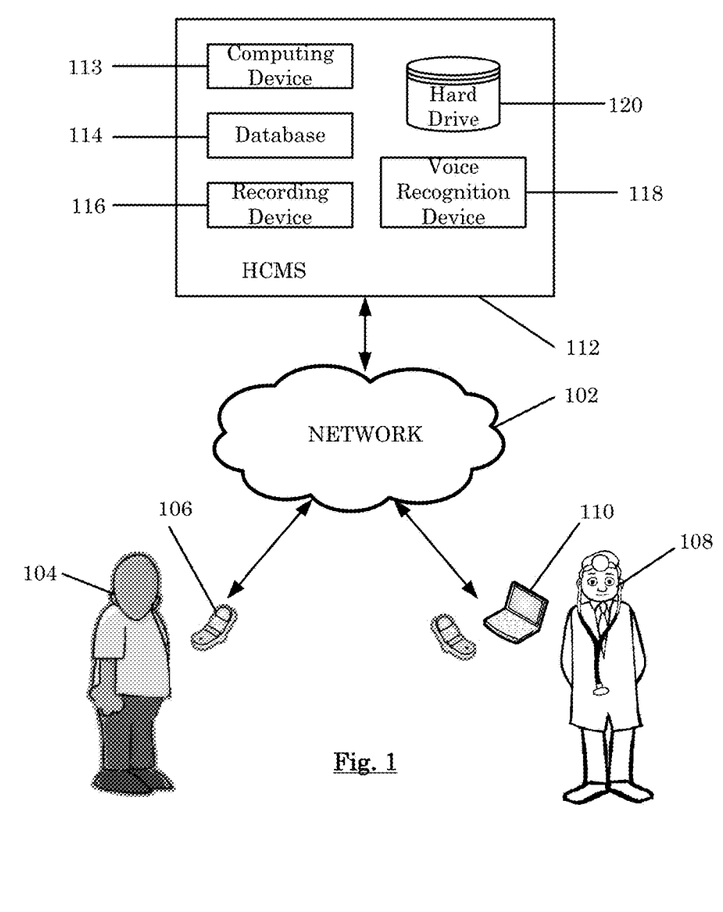
FIG. 1 is an exemplary block diagram of a system for providing healthcare related services to a patient in accordance with an embodiment of the present invention.

FIG. 1 illustrates a block diagram of an exemplary environment comprising a healthcare communication management system (HCMS) 112 implemented by a computing device such as a server for providing healthcare related services in accordance with an embodiment of the present invention. As used herein, the term "computing device" is intended to include a programmable electronic machine that performs executes software to perform several operations such as assemble, store, correlate, or otherwise processes information. In the exemplary environment, there is a network 102, which may be any type of communications medium that allows for communication between the HCMS 112, a patient 104, and a health care provider (HCP) 108. As used herein, the term "patient" refers to a person in need for a health care service that calls or communicates with the HCP. It is noted that the terms "caller" and "patient" are used interchangeably. Further, one having ordinary skill in the art will appreciate that the caller may be acting as a proxy for the patient.

As used herein, the term "health care provider" is intended to include a primary physician, on-call physician, physician assistant, nurse practitioner or other health care professionals eligible to provide the health care service to the patients. It is noted that the term "physician" is used as the HCP, however, it will be understood that the HCP can by any health care professional as mentioned above. Further, the patient's HCP or on-call HCP is used interchangeably. As used herein, the term "health care service" is intended to include a means for service, supplies and procedures for the diagnosis, prevention, treatment, and management of a health condition, illness, injury or disease.

The HCMS 112 includes any suitable communication device including a landline device, a wireless device and/or an Internet that allows for communication with any type of consumer device. The HCMS 112 is conformed to communicatively connect to a plurality of patient devices 106 operated by the plurality of patients 104 via the network 102 (e.g. the internet, or the wired or wireless telephone network). The patient devices 106 can be any device capable of communicating to the HCMS 112 via the network 102 including, but not limited to landline, telephone, a wireless device, and any computing device. In an exemplary embodiment, the patient device 106 is a mobile device (for example a handheld device or a smart phone) that communicates with the network 102 via a wireless connection. Pluralities of different HCPs 108 are also connected to the network 102 via various provider devices 110 such as for example, a landline telephone, a wireless device, and a personal computer. In an exemplary embodiment, the provider device 110 is a mobile device (for example a handheld device or a smart phone) that communicates with network 102 via a wireless connection.

The HCMS 112 includes a computing device 113 that executes a computer software program that is configured to perform the functions of a relevant content algorithm, which will be described below. The HCMS 112 also includes a communications device (not shown), for connecting to the network 102 to communicate with the patient devices 106 and the provider devices 110. The HCMS 112 includes a database 114 configured to store patient profile information. In the preferred embodiment, the term patient profile information is intended to include a patient's identification data, personal data, health history data and other miscellaneous data related to the patient 104. The HCMS 112 functions to provide various services on behalf of the HCP 108. As used herein, the term "health history" includes a comprehensive collection of medical history data including information such as existing diseases, previous health problems, injuries, medications and surgical procedures.

Some of these services include answering calls of the patient 104, retrieving patient profile information from the database 114, and providing this patient profile information to the HCP 108 prior to forwarding the call to the HCP 108. The HCMS 112 also includes a recording device 116 configured to record content of conversation during a call between the patient 104 and the HCP 108. Any suitable device known in the art may be used, including but not limited to mechanical tape, optical recorders, digital recorders, silicone chip based recording devices, and hard drive storage. Further, the HCMS 112 includes a voice recognition device 118 such as dragon, google voice, etc. which functions to transcribe the recorded conversation which is transmitted to the HCP 108 via the device 110. The HCMS 112 further includes a hard drive 120 for storing information such as greetings and recorded conversations.

The HCMS 112 also includes a patient portal (PP) 436 (shown in FIG. 4) which serves as a secure repository for the patent's 104 medical data. The PP 436 provides access to a registered patient 104 to log in and fill in their patient profile information. It also allows the patient 104 to upload any medical data and reports which are securely stored in the database 114, to be accessed only by the patient 104 and the HCP 108. Alternatively, the HCP 108 may sign off and approve the uploading of such data and reports. The PP 436 also allows the patient 104 to request appointments from a calendar that is preferably reviewed and further processed by an office staff member.

Figure 2:
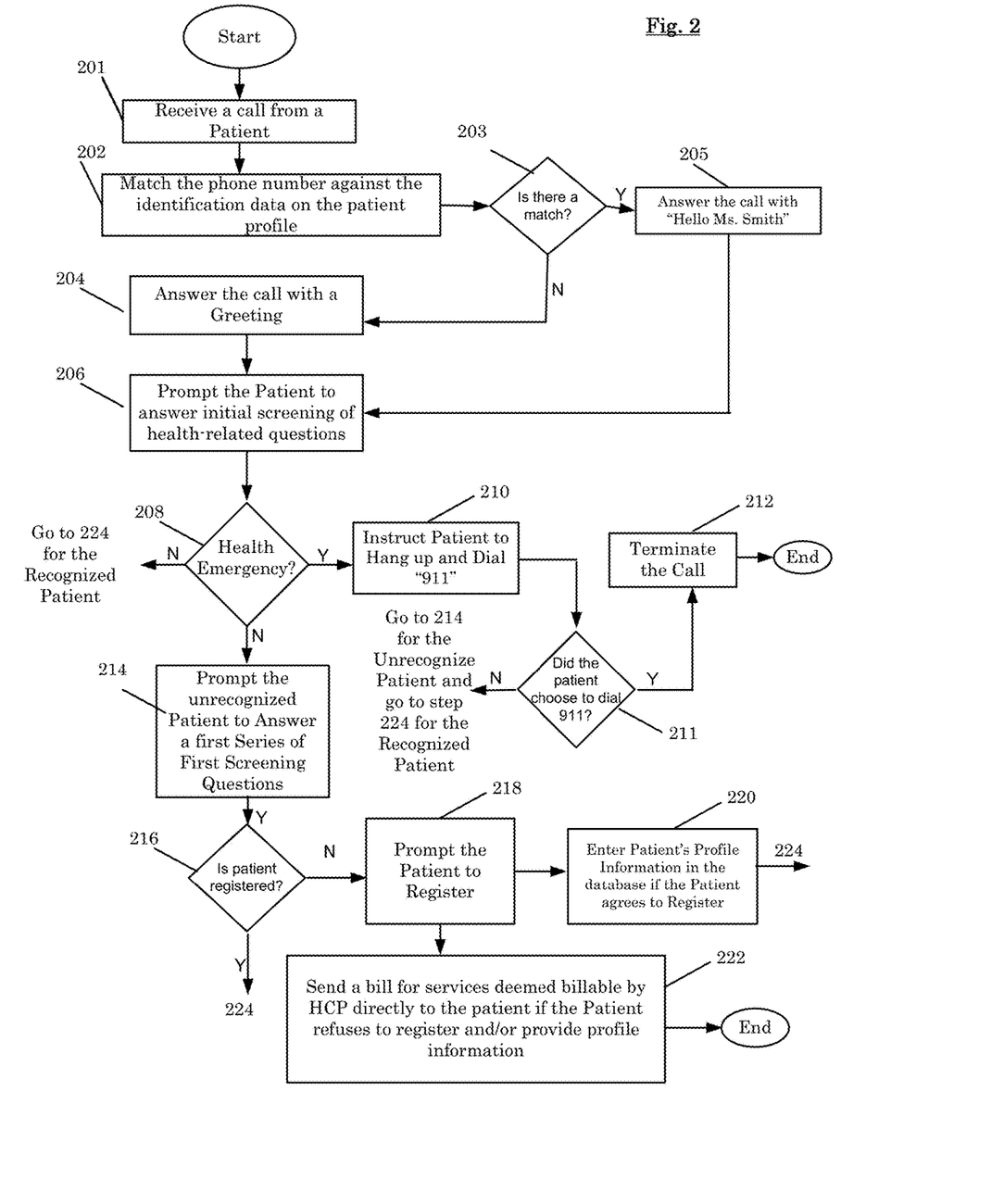
FIG. 2 is a flow diagram of an exemplary method for receiving and managing patient communication to a health care provider, according to an embodiment of the present invention.

FIG. 2 illustrates a flow diagram 200 showing the healthcare related services provided by the HCMS 112 in the environment shown in FIG. 1, according to an embodiment of the present invention. Initially, in step 201, the HCMS 112 may receive a call from a patient 104 desiring healthcare services. In the next step 202, unique identification data of the patient 104, which in this example is the telephone number used by the patient 104 to make the call, may be automatically retrieved by HCMS 112 to match against the identification data stored in the database 114 to initially check if the patient 104 is registered with the system. In the next step, 203 it may be determined whether there is a match between the phone number and the unique identification data stored in the database 112. If the phone number matches with the unique identification data stored in the database 114, then the patient 104 may be considered to be a registered patient 104, and the HCMS 112 may function to answer the call and greet the caller with a personalized greeting such as "Hello Ms. Smith" at step 205. If there is no match, then the patient 104 may initially considered to be not registered, and at step 204, the HCMS 112 functions to answer the call and greets the patient 104 with a generic greeting. In a preferred embodiment, the HCMS 112 may receive the call automatically with an introductory greeting message using an Interactive Voice Response (IVR) technology. As known to one skilled in the art, IVR is a technology that allows a computer to interact with humans through the use of voice and dual tone multi-frequency (DTMF) keypad inputs. IVR systems can respond with prerecorded or dynamically generated audio to further direct users on how to proceed. In one embodiment, the call may be received by playing back a speech file preferably stored on the hard drive 120. Alternatively, an operator may be employed to answer the call and greet the caller via the HCMS 112. Then, at step 206, the patient 104 may be prompted to answer an initial screening of health related questions to determine if it is a true health emergency. The initial screening of health related questions may be asked by an operator or it may be an automated system with a set of pre-recorded questions by playing back a speech file stored on the hard drive 120. Such topics of questions may include, but are not limited to, medical conditions relating to burns, bleeding, high fever, and cardiac arrest, etc. In the next step 208, an initial decision may be made whether the patient 104 is critically ill to be a true health emergency based on the answers to the initial screening of questions. In the instance where a triage health care professional is triaging the calls, the individual may determine the nature and extent of the emergency. If it is determined to be a true emergency, then the patient 104 is instructed to hang up and dial the emergency response telephone number "911" at step 210. Alternatively, if the patient 104 feels that the call is regarding a true medical emergency, then the patient 104 is automatically instructed by the HCMS 112 to hang up and dial "911." In the instance where no triage health care professional is triaging the calls, and in the event of a true medical emergency, then the patient 104 is automatically instructed by the system to hang up and dial "911" at step 210. At the next step 211, it is determined whether the patient chose to dial "911". If at step 211 it is determined that the patient 104 chose to dial "911", then the call is terminated at step 212. It is noted that the call can be terminated either by the HCMS 112 or the patient 104. If at step 211 it is determined that the recognized registered patient 104 chooses not to dial "911", then the method proceeds to step 224 to retrieve the identified patient's 104 profile information stored in the database 114. Also, if at step 211 it is determined that the initially unrecognized patient 104 chooses not to dial "911", then the system will attempt to proceed to step 214 so the initially unrecognized patient 104 may be prompted to answer a series of first screening questions regarding registration, followed by the retrieval and transmittal of the patient's 104 health profile and contact of the "on call" medical professional or HCP 108 for a phone consultation and or determination of the extent of the patient's 104 condition, as will be discussed in greater detail below.

Additionally, returning back to step 208, if it is determined not to be a true health emergency at step 208, then at the next step 214 the initially unrecognized patient 104 may be prompted by the HCMS 112 to answer a series of first screening questions. The questions may be asked by an operator or by an automated system with a set of prerecorded questions by playing back a speech file stored on the hard drive 120. The questions may be configured to identify the patient 104 and to determine how to handle the call. The questions may include, but are not limited to, inquiring about patient's 104 name, date of birth, social security number, insurance data, telephone number etc. In step 216, the patient's 104 answers to the questions may be used by the HCMS 112 to determine whether the patient 104 is registered. If the patient 104 is not registered, then the patient 104 is prompted by the HCMS 112 to register in step 218. If the patient 104 agrees to register, then at step 220, the patient's 104 profile information will be entered into the database 114 of the HCMS 112 or participating third party systems, such as Google Health Profile™ or Web MD™ health profile. The patient's 104 profile information may then be accessible to be sent to the HCP 108 provided that the HCP 108 has a compatible registered device 110 to receive such data, at which point the HCP 108 may review the profile information and speak with the patient 104. In the event that the patient 104 refuses the opportunity to register or has not provided profile information, then no additional data will be provided to the HCP 108 and the HCMS 112 will send a bill for the services deemed billable, by the HCP 108, directly to the patient 104 at step 222.

If it is determined at step 216 that the patient 104 is registered, or after registering the patient 104 in step 220, HCMS 112 functions to identify the patient 104 and to retrieve the identified patient's 104 profile information stored in the database 114 at step 224. Then the HCMS 112 may prompt the patient 104 at step 226 to answer a series of second screening questions to assess patient's 104 current health condition. For example, the second screening questions may include, but are not limited to, inquiring whether the patient 104 is currently experiencing symptoms such a headache, cough, fever, chest pain, high blood pressure, dizziness, shortness of breath, irregular heart beat etc. An operator may listen to the spoken words of the patient 104. Alternatively, the voice recognition device 118 may convert the spoken words of the patient 104 into text. At step 228 the HCMS 112 may determine how to route the call based on the answers to the secondary screening of questions at step 226, and the period of the time of day. Alternatively, the HCMS 112 may function to provide one or more advertisements as the call may be placed on a hold during the period of determining on how to route the call. If at step 228, it is determined that the call is during office hours and can be initially handled by the office staff, then at step 230 and the HCP 108 is not required, the HCMS 112 may connect the call to an appropriate HCP's 108 system for further handling of services provided by the HCMS 112. These services to the patients 104 include, but are not limited to, automated appointment scheduling, reminder and confirmation, and routing the calls to office staff during normal business hours for questions on forms, billing, etc.

At the decision state of step 228, if it is determined that it is before or after office hours and the patient 104 should speak to the patient's HCP 108, and then the HCMS 112 may check the on call schedule of the HCP 108, retrieve the patient's 104 profile information, and transmit the patient's 104 profile information to the on call HCP 108 at step 232. It is noted that the patient's 104 profile information may be transmitted to the on call HCP 108 either via one of a voice, facsimile, e-mail, video, text, etc. Immediately following the step 232, the HCMS 112 may connect the call to the patient's HCP'S device 110 at step 234. Then at step 236, the recording device 116 may record the conversation between the HCP 108 and the patient 104, and once the patient's HCP 108 and the patient 104 terminates the call, the recording may be stopped. The recorded call may be stored on the hard drive 120 and the call may be terminated at step 238.

Figure 3:
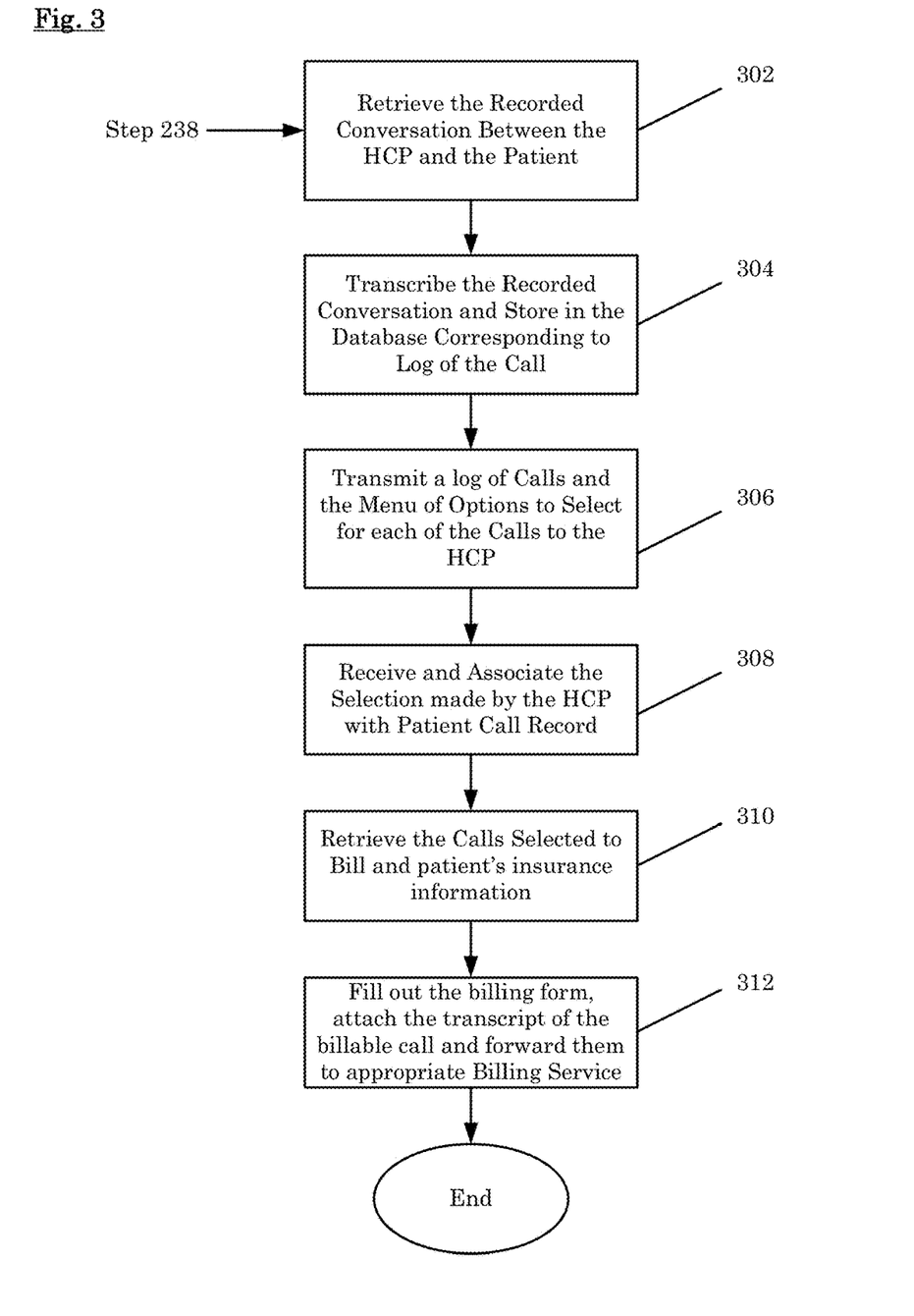
FIG. 3 is a flow diagram illustrating exemplary methods for providing healthcare related services to a health care provider utilizing the data collected in FIG. 2, according to an embodiment of the present invention.

FIG. 3 illustrates an exemplary flow diagram for providing healthcare related services utilizing the data collected according to the method shown in FIG. 2, according to an embodiment of the present invention. Starting at step 302, the HCMS 112 may retrieve the recorded conversations between the HCPs 108 and the patient 104 at step 222 of FIG. 2. In step 304, the recorded conversations may be transcribed by the voice recognition device 118 and may be stored in the database 114 corresponding to the log of the call. Note that this may be a log containing the complete patient 104 call record comprising the call details (e.g., call date, time, duration etc.), an audio recording of the call, and the automated voice to text transcript of the call. A series of log of calls along with a menu of options may then be transmitted by the HCMS 112 to the HCP 108 via the device 110 at step 306. The menus of options may include, but are not limited to, the following: 1) bill the call, 2) not bill the call and 3) decide later. The HCP 108 may preferably review the log of the calls and select one of the options provided for each call via the device 110. Upon receiving the selection of either of the options, the HCMS 112, at step 308, may associate the selection with a call record of the patient 104 in the database 114. In the next step 310, the HCMS 112 may retrieve all of the billable calls from the database 114, and the patient's 104 insurance information (stored either in the database 114 or another storage device). In the following step 312, the HCMS 112 may function to fill out the billing form, attach the voice to text transcript of the billable call and forward them to the appropriate billing service for billing.

It is noted that the HCP 108 may be the patient's primary physician from the primary practice or an on-call physician. In another embodiment, after review of the transcript between the patient 104 and the on-call physician, the patient's primary physician may need to clarify or alter the other HCP's healthcare advice to the patient and may contact the patient directly to give his or her own healthcare advice thus providing an audit of the on call advice given. In this embodiment, the patient's primary physician may use the HCMS 112 to optionally update the patient call record to reflect change in advice provided to the patient 104. In an alternate embodiment, a nurse practitioner or a physician's assistant may review the answers provided by the patients to the initial series of the questions and have a discussion with the patient 104 before making a decision whether the call needs to be forwarded to the patient's physician or on-call physician. Even though the present application describes a voice communication between the patient 104 and the HCMS 112, it is readily understood that the communication may be via electronic mail, text messaging, and video conferencing etc. Alternatively, a voice over internet technology (VOIP) application may preferably be used for both the patient device 106 and the HCP device 110. Some of the features of the VOIP application include, but are not limited to, allowing the patient 104 to connect directly with his or her HCP 108 in the HCMS 112 by name without a need to know the phone numbers of the HCP 108, allowing a patient 104 to request an appointment from a calendar allowing the doctor to see the patient's 104 PHP (personal health profile) as soon as the call comes through, permitting the HCP 108 to view their office schedule, permitting HCP 108 to change their on call status and contact number.

Figure 4:
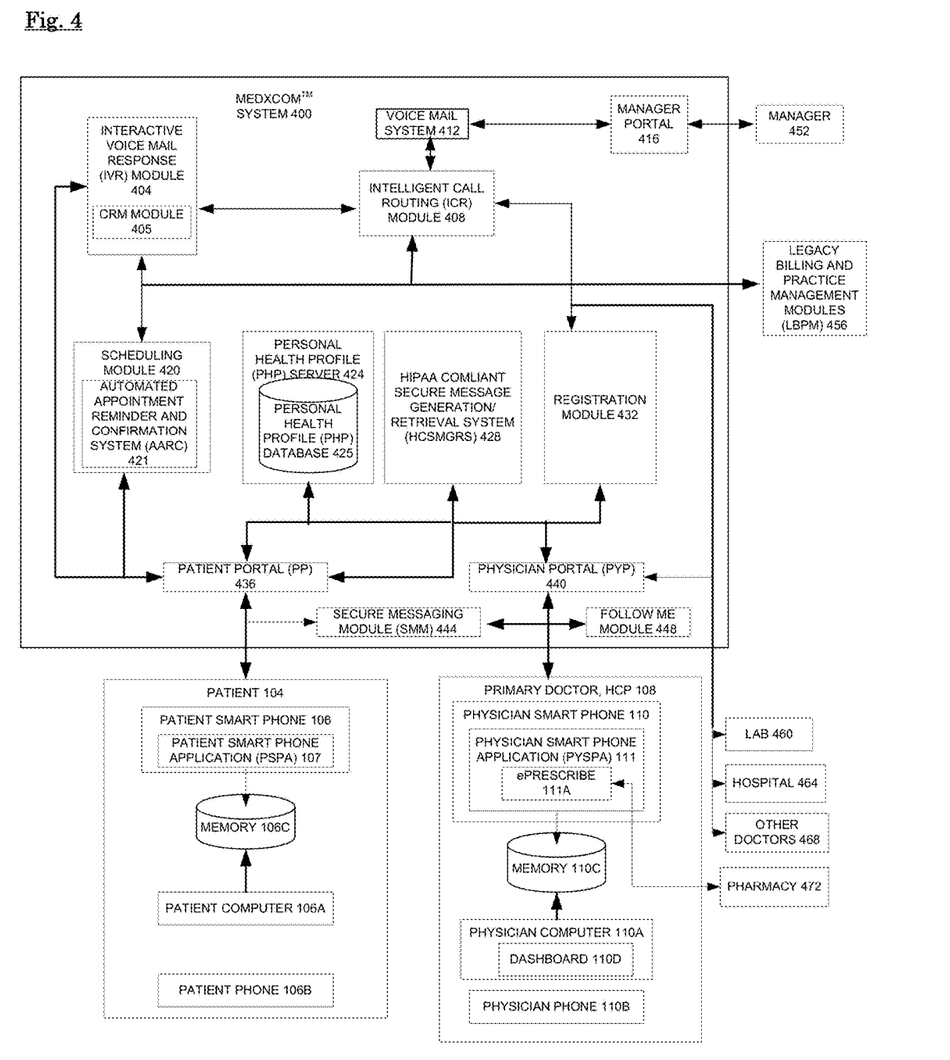
FIG. 4 is a block diagram illustrating a patient management system, according to an embodiment of the present invention.

FIG. 4 illustrates a block diagram of an exemplary environment comprising a MedXCom™ healthcare communication management system (HCMS) 400 implemented by a computing device such as a server for providing healthcare related services in accordance with an embodiment of the present invention. It is noted that the term MedXCom™ is a proprietary trademark and that the elements and features of the MedXCom™ HCMS 400 may include components that are available in the public domain and are non-proprietary.

In an embodiment, the patient 104 may communicate with the MedXCom™ HCMS 400 via the patient device 106. In an embodiment, the patient device 106 may be a smart phone. The patient device 106 may include a patient smart phone application (PSPA) 107. The PSPA 107 permits the patient 104 to take total control of his or her medical information and communication with the associated HCPs 108 via the MedXCom™ HCMS 400.

The MedXCom™ HCMS 400 includes an Intelligent Voice Response (IVR) module 404, an Intelligent Call Routing (ICR) module 408, a voice mail system 412, a manager portal 416, a scheduling module 420, a Personal Health Profile (PHP) server 424, a HIPAA Compliant Secure Message Generation and Retrieval System (HCSMGRS) 428, a registration module 432, a Patient Portal (PP) 436, a Physician Portal (PYP) 440, a Secure Messaging Module (SMM) 444, and a Follow Me Module (FMM) 448.

The patient portal (PP) 436 may comprise any suitable communication device including a landline device, a wireless device or an Internet that allows for communication with any type of consumer device accessed via a secure web HTTPS browser connection by the patient 104. In an embodiment, the PP 436 enables a patient 104 to update his or her personal health profile (PHP) information, connect with the patient's device 106, send and receive a Short Message Service (SMS) text message to and from the HCP 108, send and receive a secure email to and from the HCP 108, and access and join support group meetings, blogs, and chat rooms for the HCP's 108 practice. The PP 436 also enables a patient 104 to receive reports and laboratory data from the HCP 108 via the HCSMGR 428. The PP 436 also allows the patient 104 to upload medical reports, laboratory results, and other medical information that they have collected over the years, and store them securely on the PHP server 424. This archived information can then be retrieved and reproduced by the patient 104 at any time or transmitted to the HCP 108 via secure messaging, or in an emergency directly to his or her HCP's device 110.

After the MedXCom™ HCMS 400 receives a call from the patient 104, the PP 436 may route the call to the registration module 432. The registration module 432 is a program on the MedXCom™ HCMS 400 that maintains registration data regarding patients 104. If there is more than one person registered at a given number, then the registration module 432 may prompt the patient 104 for the last four digits of the social security number. Once the registration is confirmed then the call may be routed. As discussed above, if the caller is not registered then the registration module 432 may prompt the patient 104 to register. The registration module 432 confirms that the patient 104 when the registration process is complete. If the patient 104 is not registered and refuses to go through the registration process, then the patient 104 may be routed as an unregistered patient 104 and there will be limited or no information available about that patient 104.

The Intelligent Call Routing (ICR) module 408 is a program on the MedXCom™ HCMS 400 for handling and routing the calls from the patient 104 via, for example, the Legacy office PBX or a MedXCom™ PBX. The MedXCom™ PBX is a proprietary private branch exchange telephone system that includes certain embodiments of the invention as described herein. The patient 104 may instruct the ICR module 408 to leave a message on a voice mail system 412. The voice mail may be logged and displayed by the manager portal 416 for retrieval and to view retrieval status. The manager portal 416 is a program on the MedXCom™ HCMS 400 for managing the status of calls and the retrieval of calls. The voice mail message may also be transcribed and available to be viewed on the manager portal 416. The manager portal 416 may be accessed by an administrator or by a manager 452. Otherwise, the patient 104 may be placed on hold and may hear directed advertisements, which may generate revenue for the HCP 108.

The ICR module 408 may route the call to the Interactive Voice mail Response (IVR) module 404. The IVR module 404 is a program on the MedXCom™ HCMS 400 for responding to the voicemail message from the patient 104. The IVR module 404 includes a Call Routing Module (CRM) 405. The CRM 405 is a program within the IVR module 404 which may identify the patient 104 by name and their last call, "Hello Mrs. Smith, I see you called yesterday and spoke with Wanda. Would you like to speak with her again today or can I help you with something else." The CRM 405 may direct the patient 104 to a specific extension of an office staff member by name or number or the CRM 405 may allow the patient 104 to chose to speak to a live receptionist who is either in the office or one who is provided by the MedXCom™ HCMS 400 and is off site and shared by many practices. Either of these live operators may schedule appointments by connecting to the scheduling module 420.

The scheduling module 420 is a program on the MedXCom™ HCMS 400 for scheduling appointments with the HCP 108 and for sending reminder messages to the patient 104 via the Automated Appointment Reminder and Confirmation (AARC) system 421 from the scheduling module 420. The AARC 421 is an application within the scheduling module 420 that maintains and sends appointment reminders to the patient 104. The AARC 421 may send a message to the patient 104 via SMS text, secure email, or a voice IVR confirmation system which will call the patient 104 at home and wait for a prompted response to either confirm or change a previously scheduled appointment. The patient 104 may also opt to respond to the SMS text or email to confirm or change an appointment.

The patient 104 may opt to pay a balance due and can do so from the IVR module 404 and connect to a legacy billing and practice management module (LBPM) 456 through an application programming interface (API). The patient 104 may also choose to schedule an appointment from the IVR module 404 and connect to a LBPM 456 through an API. The LBPM 456 may be linked to the registration module 432 via the API.

In an embodiment, if a patient 104 calls before or after normal business hours, the patient 104 may be asked to state his or her name and reason for calling as well as to verify their call back number (just in case it is not the same as the number they are calling from nor their home number from which they were identified). The patient 104 may be routed to a module for playing advertisements while the patient 104 is on hold, e.g., Directed Ads On Hold™, while the MedXCom™ HCMS 400 connects to the on call schedule of the HCP 108. The covering doctor or HCP 108 may be identified and the HCP's 108 Follow Me Mode may be activated. In an embodiment, the Follow Me Mode is an application on a Follow Me Module (FMM) 448. The FMM 448 is a program on the MedXCom™ HCMS 400 for establishing contact with an HCP 108 via a smart phone application or provider device 110.

Based upon the Follow Me Mode preferences, which may include the personal preference information of an HCP 108, the number listed for the preference during the time is called. If the number is not answered, the FMM 448 will search out the HCP 108 using the predefined sequence of numbers to call, as defined in the Follow Me Mode preferences. If the HCP 108 is at a number other than his or her smart phone app or provider device 110, then the MedXCom™ HCMS 400 will call that number and connect to the HCP 108. If, however, the HCP 108 is using their provider device 110, then a VOIP call may be connected to that device 110. Using the PHP entered by the patient 104 at an earlier date and retrieved from a PHP server 424, the PHP data is sent to the HCP's device 110. In an embodiment, a PHP server 424 is a server that stores and maintains a patient's 104 PHP data. The PHP data, which is stored on the PHP database 425, may be mined based on what information that the HCP 108 believes is important in order to take care of their particular patient 104.

The patient's 104 PHP data may be entered in the MedXCom™ HCMS 400 via the patient's device 106 via the PP 436 for storage on both the patient smart phone app (PSPA) 107 and the PHP server 424. The PSPA 107 is an application on the patient's device 106. In doing so, the patient 104 controls who may have access to the patient's 104 PHP data via a permission system located on both the PSPA 107 and the PP 436. When the patient 104 calls an HCP 108, the PHP data may be sent to the physician's smart phone application (PYSPA) 111 and data mined for relevant info for that particular type of HCP 108, and he mined info may be sent to the PYSPA 111 for display of that critical medical information at the time of the emergency phone call. The PYSPA 111 is an application that executes on the physician device 110 and, along with the PYP 440, serves as a mobile hub of communications for the HCP 108. In an embodiment, the PHP data can also be printed easily or access can be given to a non-participating practice for printing or transfer to, for example, and emergency room.

The patient 104 may also upload PHP data and information on to the PP 436, and information from the PP 436 can be accessed via the PSPA 107 or the patient device 106. The PSPA 107 and the patient device 106 may be used to update the PHP and any changes to the PHP made via the PP 436 may be sent to the PSPA 107 to update the cache memory for the PHP. The PHP data may be sent to the provider's device 110 during an emergency call. A meet me conferencing with HCPs 108 can occur via the PSPA 107. The patient 104 may communicate with other patients 104 via a Support Group/ Meetings/Blogs/Chat Module. The patient 104 may exchange text messages with their HCPs 108 via the Secure Message Module (SMM). Emails may be sent to the PP 436 for review. The patient 104 may use the PSPA 107 via a VOIP call into the MedXCom™ HCMS 400 directly without using the actual cell phone via a phone call. Since the application is registered to only one patient 104, the MedXCom™ HCMS 400 may identify the VOIP call from that application as one coming from that registered patient 104.

The patent's 104 PHP data may be displayed on the PYSPA 111 on the provider device 110. The MedXCom™ HCMS 400 may then route the call to the HCP 108. In either case, the HCP 108 may hear the name and message left for them by the patient 104 when the call is connected. The MedXCom™ HCMS 400 may give the HCP 108 the option to: "Accept"the call and be connected to the patient 104; select "Call Back" and then have the MedXCom™ HCMS 400 call back for a defined period of time and reconnect them to the patient 104; or defer the call and they can call the patient 104 back when the HCP 108 finds the time. Once connected, the calls may be recorded and transcribed. At the end of the call, the HCP 108 may be given the opportunity to dictate an addendum to the call which he or she may feel is appropriate for documentation but not specifically for discussion with the patient 104. This transcription may be queued for transcription and billing submission for a telephone consultation. Calls with their transcriptions and billing info may be sent to the manager portal 416 so that they can be submitted to the insurance company for reimbursement. In an embodiment, the recorded conversation may be transmitted to the patient 104. Also, the transcription of the recorded conversation may be transmitted to the patient 104.

After the call, the HCP 108 has the option to send a follow up email or text message from the PYSPA 111 to the patient 104 regarding instructions related to the call. These messages may be such things as basic wound care instructions or a reiteration to go to the nearest emergency room for treatment. This message may be sent from the HIPAA Compliant Secure Messaging Generation and Retrieval System (HCSMGRS) 428 via Short Message Service (SMS) text message or secure email. The HCSMGRS 428 is a program on the MedXCom™ HCMS 400 for generating and retrieving messages in compliance with Health Insurance Portability and Accountability Act (HIPAA) laws. The HCP 108 may need to prescribe medicine to the patient 104 based on the phone conversation. The HCP 108 may send the prescription directly via an electronic prescription program such as ePrescribe™ 111A, or to the pharmacy 472 right from a link on their PYSPA 111 or provider device 110.

The Physicians Portal (PYP) 440 is the communication and messaging hub for the entire system for the HCP 108. Hospitals 464 and laboratories 460 can send reports and data directly to the PYP 440 for review, and other doctors 468 can collaborate by sending reports and data to each other. The reports, data, and messages may be displayed on the dashboard 110D, and may display the status of the message as unread, read, forwarded or cc'd. A dashboard 110D is a tool on the physician's computer 110A or on the physician device 110 that enables the HCP 108 to view and manage data. In addition, calls that have entered the MedXCom™ HCMS 400 may have been recorded and available for playback. This may include a log of all the calls with the recording files attached and may be accessible for review at the click of an icon on the PYSPA 111 or the provider device 110. The transcriptions of the calls and the initial messages may be displayed on the PYSPA 111 or the provider device 110 in a time sequence for review. The status of each call may be displayed in case, for example, any calls went unanswered. In an embodiment, the PYP 440 may display the daily patient's 104 schedule for review via a connection to the legacy practice management system. The HCP 108 may also change or review the On Call Schedule directly from this screen. The HCP 108 may also change his or her Follow Me Mode status and update as needed. All email communications to or from the SMM 444 may be reviewed and sent from an email tab within the PYP 440. Any provider conference bridge conversations may be displayed as a recording or a transcription in a log on the PYP 440.

HCP 108 may communicate directly with the MedX-Com™ HCMS 400 via the PYPSA 111. The HCP 108 may access and change his or her FMM status from the PYPSA 111. The HCP 108 may access and update or change his or her on call schedule by accessing the On Call Scheduling Module (OCSM) from their PYPSA 111. Most importantly, when a call from a patient 104 comes in, the patient's 104 PHP data may be sent to and displayed on the PYSPA 111 when it is needed most—at the time of the patient 104 contact during the call. The PYSPA 111 allows for electronic prescription applications such as ePrecribe™ 111A to send prescriptions to the pharmacy 472 for the patient 104 based on the listed pharmacy 472 in the patient's 104 PHP. The HCP 108 may also send an email confirmation or reminder to the patient 104 in order to ensure or reinforce understanding of what was discussed with the patient 104 during the previous call. All calls may be recorded for quality review and may be transcribed for archival documentation or billing purposes. In an embodiment, the recorded conversation may be transmitted to the patient 104. Also, the transcription of the recorded conversation may also be transmitted to the patient 104. This may enable the patient 104 to confirm any important points that were made by the HCP 108 during the call. The HCP 108 may also make an addendum to the call for a personal reminder or a clarification of why certain things were said or to emphasize a point (such as the patient 104 continues to smoke despite repeatedly being told to stop smoking). Through the PYSPA 111, the provider or HCP 108 can access the Provider's Contact List (PCL) and contact any other provider or HCP 108 on the HCMS 112 directly via VOIP, and share data regarding their patient 104 in real time.

Figure 5:
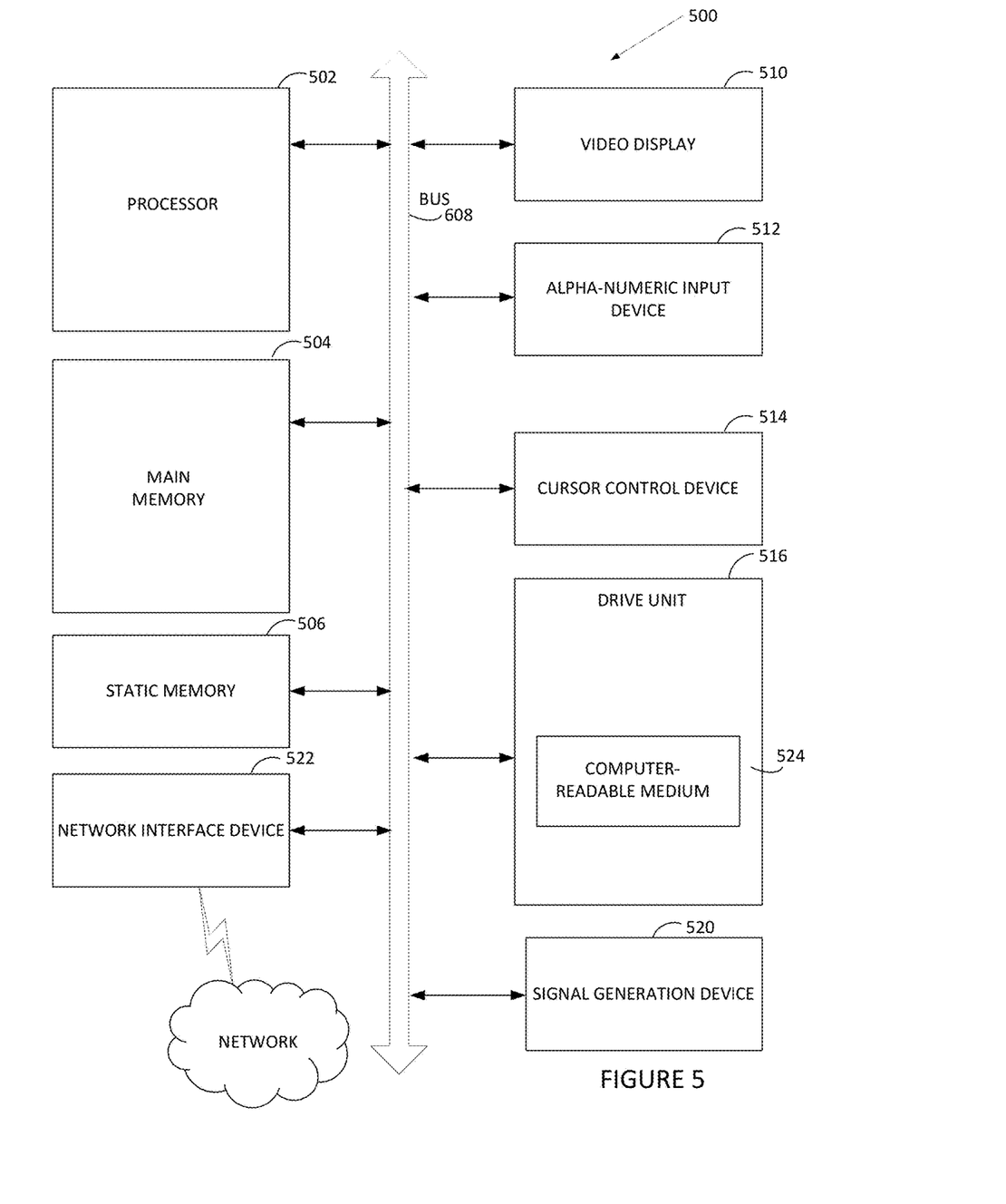
FIG. 5 is a block diagram illustrating a computer system that may perform one or more of the operations described herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

A drive unit 516 may include a computer-readable medium 524 on which is stored one or more sets of instructions embodying any one or more of the methodologies or functions described herein. The instructions may also reside, completely or at least partially, within the main memory 504 and/or within the processing device or processor 502 during execution thereof by the computer system 500, the main memory 504 and the processor 502 also constituting computer-readable media. The instructions may further be transmitted or received over a network via the network interface device 522.

While the computer-readable storage medium 524 is shown in an exemplary embodiment to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

It is to be understood that the exemplary embodiments are merely illustrative of the invention and many variations of the above-described embodiments can be devised by one skilled in the art without departing from the scope of the invention. It is therefore intended that all such variations be included within the scope of the following claims and their equivalents.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "creating," "associating," "maintaining," "receiving," "authenticating," "refraining," "identifying," "specifying," "determining," "granting," "accessing," "as signing," "executing," "monitoring," "detecting," "requesting," "routing", "generating", "recording", "transmitting", "transcribing", and "adjusting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a processing device, a call from a communication device associated with a patient, the communication device associated with a patient comprising a first application and having a unique identifier;
   associating, by the processing device, the unique identifier with a personal health profile stored in a database, wherein the personal health profile comprises medical information of the patient and an on call schedule of a first health care provider associated with the patient;
   determining, by the processing device, a first communication device associated with the first health care provider based on the on call schedule;
   transmitting, by the processing device, the personal health profile to the first communication device via an electronic communication;
   communicatively connecting, by the processing device, the call from the communication device associated with the patient with the first communication device associated with the first health care provider;
   recording a conversation between the patient and the first health care provider during the communicatively connected call from the communication device associated with the patient with the first communication device associated with the first health care provider;
   generating, by the processing device, a transcription based on the communicatively connected call between the patient and the first health care provider;
   storing the recorded conversation in the database;
   storing the transcription of the recorded conversation in the database;
   receiving, by the processing device, an update to the transcription from at least one of the first communication device associated with the first health care provider or a second communication device associated with a second health care provider;
   storing, by the processing device, the update to the transcription in association with the personal health profile;
   transmitting the recorded conversation to the patient;
   transmitting the transcription of the recorded conversation to the patient;
   generating, by the processing device, a completed billing form based in part on a log of the call from the communication device associated with patient; and
   transmitting the completed billing form and the transcription of the recorded conversation to a billing service.

2. The method of claim 1, further comprising:
   receiving, by the processing device, a message from the first communication device associated with the first health care provider, the message comprising medical information provided by the first health care provider to the patient;

determining, by the processing device, that the message is in compliance with one or more US HIPAA laws; and transmitting the message to the patient.

3. The method of claim 1, further comprising:

generating, by the processing device, an appointment reminder message, the appointment reminder message comprising information to remind the patient of an appointment with at least one of the first health care provider or the second health care provider; and transmitting the appointment reminder message to the patient.

4. The method of claim 3, further comprising:

receiving a confirmation message from the patient in response to the transmitted appointment reminder message.

5. A system comprising:

a database; and a processing device communicatively coupled to the database, the processing device configured to:

receive a call from a communication device associated with a patient, the communication device associated with a patient having a unique identifier;

associate the unique identifier with a personal health profile stored in a database, wherein the personal health profile comprises medical information of the patient and an on call schedule of a first health care provider associated with the patient;

determine a first communication device of a plurality of communication devices associated with the first health care provider based on the on call schedule;

transmit the personal health profile to the first communication device associated with the first health care provider via an electronic communication;

communicatively connect the call from the communication device associated with the patient with the communication device associated with the first health care provider;

record a conversation between the patient and the first health care provider during the communicatively connected call from the communication device associated with the patient with the first communication device associated with the first health care provider;

generate a transcription based on the communicatively connected call between the patient and the first health care provider;

store the recorded conversation in the database;

store the transcription of the recorded conversation in the database;

receive an update to the transcription from at least one of the first communication device associated with the first health care provider or a second communication device associated with a second health care provider;

store the update to the transcription in association with the personal health profile;

transmit the recorded conversation to the patient;

transmit the transcription of the recorded conversation to the patient;

generate a completed billing form based in part on a log of the call from the communication device associated with patient; and transmit the completed billing form and the transcription of the recorded conversation to a billing service.

6. The system of claim 5, wherein the processing device is further configured to:

receive a message from the communication device associated with a health care provider, the message comprising medical information from the first health care provider to the patient;

determine that the message is in compliance with one or more US HIPAA laws; and transmit the message to the patient.

7. The system of claim 5, wherein the processing device is further configured to:

generate an appointment reminder message, the appointment reminder message comprising information to remind the patient of an appointment with at least one of the first health care provider or the second health care provider; and transmit the appointment reminder message to the patient.

8. The system of claim 7, wherein the processing device is further configured to:

receive a confirmation message from the patient in response to the transmitted appointment reminder message.

9. A non-transitory computer readable storage medium including instructions that, when executed by a processing device, cause the processing device to:

receive, by the processing device, a call from a communication device associated with a patient, the communication device associated with the patient having a unique identifier;

associate, by the processing device, the unique identifier with a personal health profile stored in a database, wherein the personal health profile comprises medical information of the patient and an on call schedule of a first health care provider associated with the patient;

determine, by the processing device, a first communication device of a plurality of communication devices associated with the first health care provider based on the on call schedule;

transmit the personal health profile to the first communication device associated with the first health care provider via an electronic communication;

communicatively connect the call from the communication device associated with the patient with the communication device associated with the first health care provider;

record a conversation between the patient and the health care provider during the communicatively connected call from the communication device associated with the patient with the first communication device associated with the first health care provider;

generate a transcription based on the communicatively connected call between the patient and the first health care provider;

store the recorded conversation in the database;

store the transcription of the recorded conversation in the database;

receive an update to the transcription from at least one of the first communication device associated with the first health care provider or a second communication device associated with a second health care provider;

store the update to the transcription in association with the personal health profile;

transmit the recorded conversation to the patient;

transmit the transcription of the recorded conversation to the patient;

generate, by the processing device, a completed billing form based in part on a log of the call from the communication device associated with patient; and transmit the completed billing form and the transcription of the recorded conversation to a billing service.

10. The non-transitory computer readable storage medium of claim 9, the processing device to:
receive, by the processing device, a message from the first communication device associated with the first health care provider, the message comprising medical information from the first health care provider to the patient;
determine, by the processing device, that the message is in compliance with one or more US HIPAA laws; and
transmit, the message to the patient.

11. The non-transitory computer readable storage medium of claim 9, the processing device to:
generate, by the processing device, an appointment reminder message, the appointment reminder message comprising information to remind the patient of an appointment with the first health care provider; and
transmit the appointment reminder message to the patient.

\* \* \* \* \*